United States Patent
Duss

(10) Patent No.: US 8,121,391 B2
(45) Date of Patent: Feb. 21, 2012

(54) DEVICE FOR MEASURING THE THICKNESS OF PRINTED PRODUCTS

(75) Inventor: Hanspeter Duss, Olten (CH)

(73) Assignee: Mueller Martini Holding AG, Hergiswil (CH)

( * ) Notice: Subject to any disclaimer, the term of this patent is extended or adjusted under 35 U.S.C. 154(b) by 308 days.

(21) Appl. No.: 12/429,531

(22) Filed: Apr. 24, 2009

(65) Prior Publication Data
US 2009/0268957 A1 Oct. 29, 2009

(30) Foreign Application Priority Data
Apr. 25, 2008 (EP) .................................... 08155221

(51) Int. Cl.
*G06K 9/00* (2006.01)
(52) U.S. Cl. .................. 382/141; 382/145; 382/147
(58) Field of Classification Search .................. 382/141, 382/143–145, 147
See application file for complete search history.

(56) References Cited

U.S. PATENT DOCUMENTS

| | | | |
|---|---|---|---|
| 3,834,031 A | 9/1974 | Mueller | |
| 3,899,165 A | 8/1975 | Abram et al. | |
| 4,170,346 A | 10/1979 | Murray et al. | |
| 4,778,167 A | 10/1988 | Snow et al. | |
| 5,622,268 A | 4/1997 | Conner et al. | |
| 5,770,949 A * | 6/1998 | Sgro | 73/159 |
| 6,445,975 B1 | 9/2002 | Ramsey | |
| 6,702,281 B2 * | 3/2004 | Post et al. | 271/258.01 |
| 2003/0066201 A1 * | 4/2003 | Moisio et al. | 33/501.02 |
| 2004/0172842 A1 | 9/2004 | Petrowich | |

FOREIGN PATENT DOCUMENTS

| | | |
|---|---|---|
| CH | 523 787 | 7/1972 |
| EP | 0 714 789 A2 | 6/1996 |
| EP | 1 790 605 A1 | 5/2007 |

OTHER PUBLICATIONS

European Search Report dated Oct. 10, 2008, directed to counterpart EP 08155221.8-2213 application (6 pages).

* cited by examiner

*Primary Examiner* — Gregory J Toatley
*Assistant Examiner* — Iyabo S Alli
(74) *Attorney, Agent, or Firm* — Venable LLP; Robert Kinberg; Leigh D. Thelen

(57) ABSTRACT

An apparatus for measuring a thickness of a printed product conveyed in a conveying direction at a conveying speed. The apparatus includes a conveying device having a guide arrangement along which the printed product is conveyed at the conveying speed in the conveying direction, the guide arrangement including a measuring region that extends in the conveying direction of the guide arrangement. The apparatus further includes a measuring element operative to act on printed sheets of the printed product to measure the thickness of the printed product while the printed product is conveyed across the measuring region and through a measuring gap located between the measuring element and the guide arrangement. The measuring element is arranged to move toward the guide arrangement with a process timing and to move synchronously with the printed product at the conveying speed across the measuring region of the guide arrangement. The apparatus additionally includes an evaluation unit connected to the measuring element.

18 Claims, 8 Drawing Sheets

DEVICE FOR MEASURING THE THICKNESS OF PRINTED PRODUCTS

CROSS-REFERENCE TO RELATED APPLICATION

This application claims the priority of European Patent Document EP 08155221.8, filed on Apr. 25, 2008, the subject matter of which is incorporated herein by reference.

BACKGROUND OF THE INVENTION

The invention relates to an apparatus for measuring the thickness of printed products that are transported with the aid of a conveying device along a guide arrangement, the apparatus comprising a measuring element that forms a measuring gap together with the guide arrangement and acts upon the printed sheets on the side facing away from the guide arrangement, wherein the measuring element is furthermore connected to an evaluation unit.

A device for measuring the thickness of printed products is disclosed in Swiss Patent Document CH-A-523 787. This device is provided with a sensing wheel and a thereto assigned counter wheel. The printed products to be measured pass between these two wheels. The sensing wheel is deflected corresponding to the thickness of the measured printed products. Printed products that are too thin or which miss one or more printed sheets can thus be detected and removed. The aforementioned device has proven itself in practical operations. However, with printed products composed of thin paper, the individual printed sheets can be displaced, relative to each other, as a result of squeezing. In addition, the movement of the printed products while passing between the two wheels can furthermore result in leaving undesirable marks during the measuring operation on products with sensitive surfaces. Since the wheels must be positioned extremely precisely and must be driven while the machines operate at fast speeds, this measuring device is comparatively expensive and involved.

U.S. Pat. No. 4,170,346 discloses a measuring device for the capacitive and thus contact-less measuring of printed products that pass through. However, a capacitive measuring is not precise enough for measuring thin printed products and the scattering is comparatively high.

European Patent Document EP-A-0 714 789 discloses a measuring device on a gathering and wire-stitching machine, which also uses a sensing wheel and an associated counter wheel. The movement of the sensing wheel perpendicular to the conveying direction is measured with the aid of a laser beam. However, this device also has the aforementioned difficulties.

SUMMARY

It is therefore an object of the present invention to provide a measuring apparatus, which avoids the above-described disadvantages and difficulties. In particular, the measuring apparatus should be embodied such that the printed products can be measured in a more careful manner and especially without pressing or squeezing.

The above and other objects are accomplished according to one aspect of the invention wherein there is provided an apparatus for measuring a thickness of a printed product conveyed in a conveying direction at a conveying speed. The apparatus includes a conveying device having a guide arrangement along which the printed product is conveyed at the conveying speed in the conveying direction, the guide arrangement including a measuring region that extends in the conveying direction of the guide arrangement. The apparatus further includes a measuring element operative to act on printed sheets of the printed product to measure the thickness of the printed product while the printed product is conveyed across the measuring region and through a measuring gap located between the measuring element and the guide arrangement. The measuring element is arranged to move toward the guide arrangement with a process timing and to move synchronously with the printed product at the conveying speed across the measuring region of the guide arrangement. The apparatus additionally includes an evaluation unit connected to the measuring element.

In one embodiment the respective measuring element may move along with the printed product to be measured, at least in some sections. Further, the measuring element can respectively act upon the printed products by moving toward the guide arrangement. With the measuring apparatus according to this embodiment, the measuring element moves along with the printed product to be measured, thereby avoiding a squeezing and damage to the printed product. The thickness of the printed product can be sensed mechanically with this measuring element, which also permits the measuring of individual and comparably thin sheets. Meanwhile, thicker products such as newspapers, brochures, books and the like can similarly be measured with this measuring apparatus. An additional advantage of the measuring device according to this embodiment is that the product geometry of the printed product is not disturbed during the measuring operation. The measuring location on the printed product can be moved easily and a comparatively simple configuration is possible as well.

According to another embodiment, the measuring element can be moved with essentially the same speed as the conveying speed for the printed products to be measured. A relative movement between the measuring element and the printed product to be measured is consequently avoided during the measuring operation, which allows for careful measuring.

In yet another embodiment, the measurement is taken against a locally-fixed guide arrangement, which can be realized easily in the form of a simple structure, for example a rigid piece of sheet metal or the like. To avoid frictional forces, a measuring region on the guide arrangement can be coated with a friction-reducing material, for example a suitable plastic material. According to a different embodiment, a cushion of air may be generated on the side of the guide arrangement that is acted upon.

The measuring element according to another embodiment can be moved against the printed products in a direction that is substantially transverse to the conveying direction for the printed products. In another embodiment the measuring element may move in a direction that deviates from a right-angle, relative to the conveying direction. In particular, the measuring element can move either linear in longitudinal direction or can be pivoted.

According to one embodiment, the measuring element can be moved with a controlled movement toward the respective printed product to be measured. The speed at which the measuring element is moved toward the printed product is preferably controlled such that the speed drops with decreasing distance to the printed product. As a result, an even more careful and also more precise measuring operation is possible. The control can be based on a reference measurement, which makes it possible to lower the speed of the measuring element just before it acts upon the printed product. A movement profile is thus possible, which is based on the average thickness of the printed products. Thick printed products, for example newspapers, brochures and the like, can consequently be measured with a different movement profile than individual sheets of comparatively thin paper.

A measuring mechanism is provided according to a different embodiment, which may measure a section traveled by the measuring element when it acts upon the printed product. The measuring mechanism may be embodied differently, for example as a mechanical, optical, electrical mechanism or the like. In particular, a contactless-operating mechanism is provided for measuring the aforementioned travel distance, especially with the aid of a laser beam.

According to another embodiment, the aforementioned measuring mechanism may comprise a measuring coil, which can be arranged directly on the measuring element and permits a fast and precise measuring of the movement of the measuring element.

The measuring element according to a different embodiment is arranged on a carrier or a wagon to be moved along with the printed product in the conveying direction of the printed products, respectively for one measurement. A linear motor or a different suitable servo motor can be used, for example, to drive the carrier or the wagon. With this motor, the carrier or the wagon can be moved in a measuring region in the conveying direction, at the same speed as the printed products to be measured, and can subsequently be moved back to a starting or rest position.

The measuring element for another embodiment is moved with the aid of a motor, in particular a linear motor, toward the printed product to be measured, wherein such movement of the measuring element is synchronized with the conveying movement (process timing) of the printed products. A controlled movement of the measuring element is possible with the linear motor and, in particular, making it possible to have precisely controlled movement profiles. The speed of the measuring element during the approach to the printed product can thus be lowered precisely, which permits extremely fast measurements. A printed product can furthermore be measured multiple times, thus also making possible control measurements.

According to one embodiment, the measuring element has a front end with a moving part positioned thereon, in particular a wheel or a ball. Alternatively, a cushion of air can also be formed at the aforementioned front end, thus allowing an even more careful sensing of the printed products.

According to one embodiment, the measuring element is positioned displaceable in a guide element, wherein this guide element is preferably movable in conveying direction of the printed products. The measuring element can consequently move along in the conveying direction of the printed products while simultaneously moving toward the printed products for the sensing operation. The front end of the measuring element can be moved along an optional, changeable path by correspondingly controlling the linear motors.

According to one embodiment, the measuring element can be moved with the force of a tensioned spring element toward the printed product to be measured. With each return movement of the measuring element to the resting position, the spring element can be tensioned again.

According to yet another embodiment, the measuring element may be embodied in the form of a die, rod or finger, wherein the measuring element is provided with a front sensing surface, which acts upon the printed product to be measured. A particularly careful contact between the measuring element and the product is provided if the measuring element has mechanism for forming a cushion of air on the aforementioned sensing surface.

According to one embodiment, the measuring device comprises at least two measuring elements, which are arranged essentially symmetrical to each other with respect to the conveying section, thereby making possible a measuring device where the measuring forces acting upon the guide arrangement primarily cancel each other out. For example, if the printed products are conveyed on a gathering chain, two measuring elements can be symmetrically-arranged relative to each other, and can also be moved simultaneously. The thickness of the same printed product can be measured once or twice to avoid measuring errors. For example, the at least two measuring elements may be arranged on the same carrier or wagon and move simultaneously.

BRIEF DESCRIPTION OF THE DRAWINGS

The present invention will be more readily understood from the following detailed description when read in conjunction with the accompanying drawings, in which.

DETAILED DESCRIPTION

Figure 1:
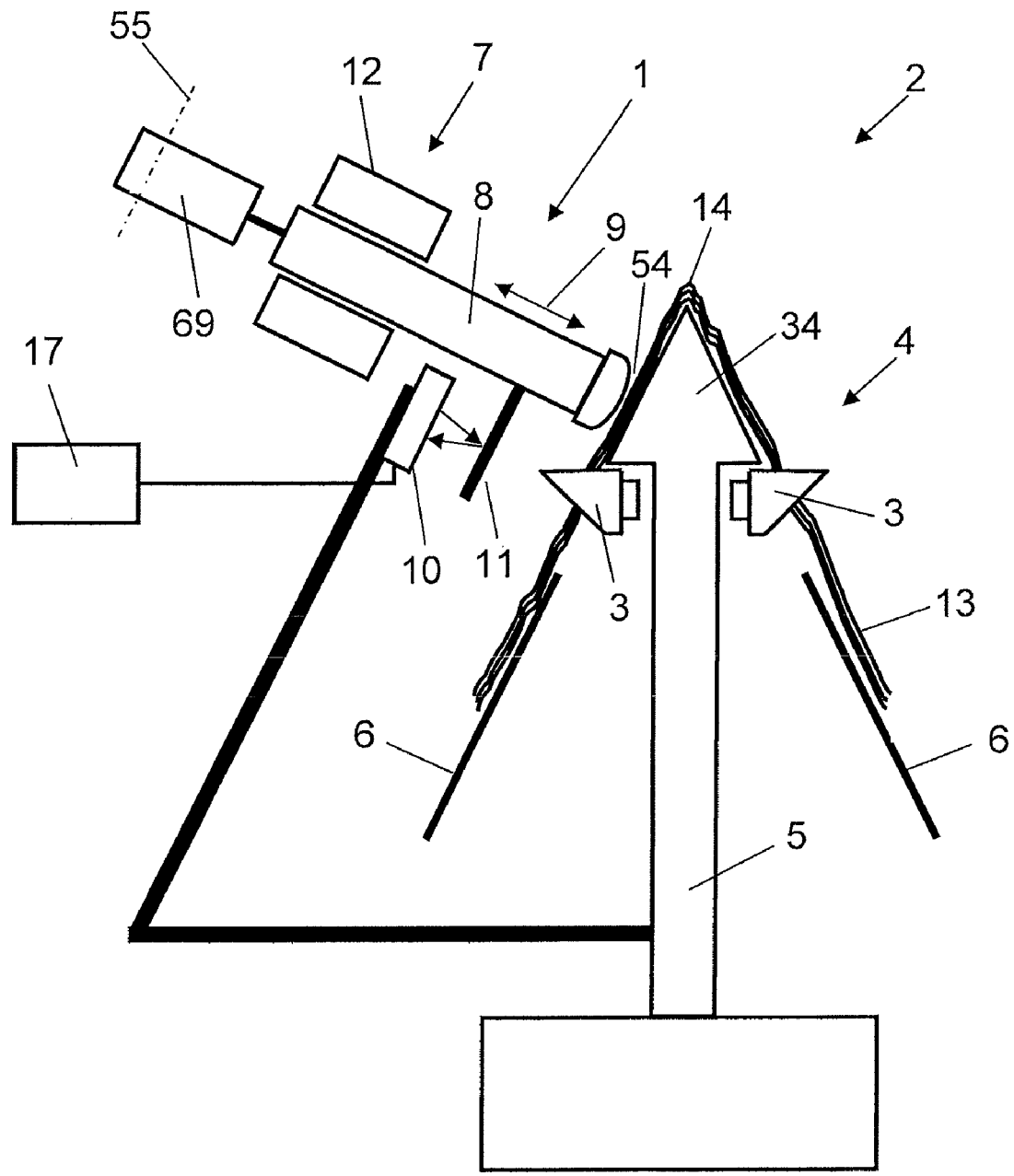
FIG. 1 is a section view through a measuring apparatus according to the invention and a conveying device, as seen along the line I-I in FIG. 2.
Figure 2:
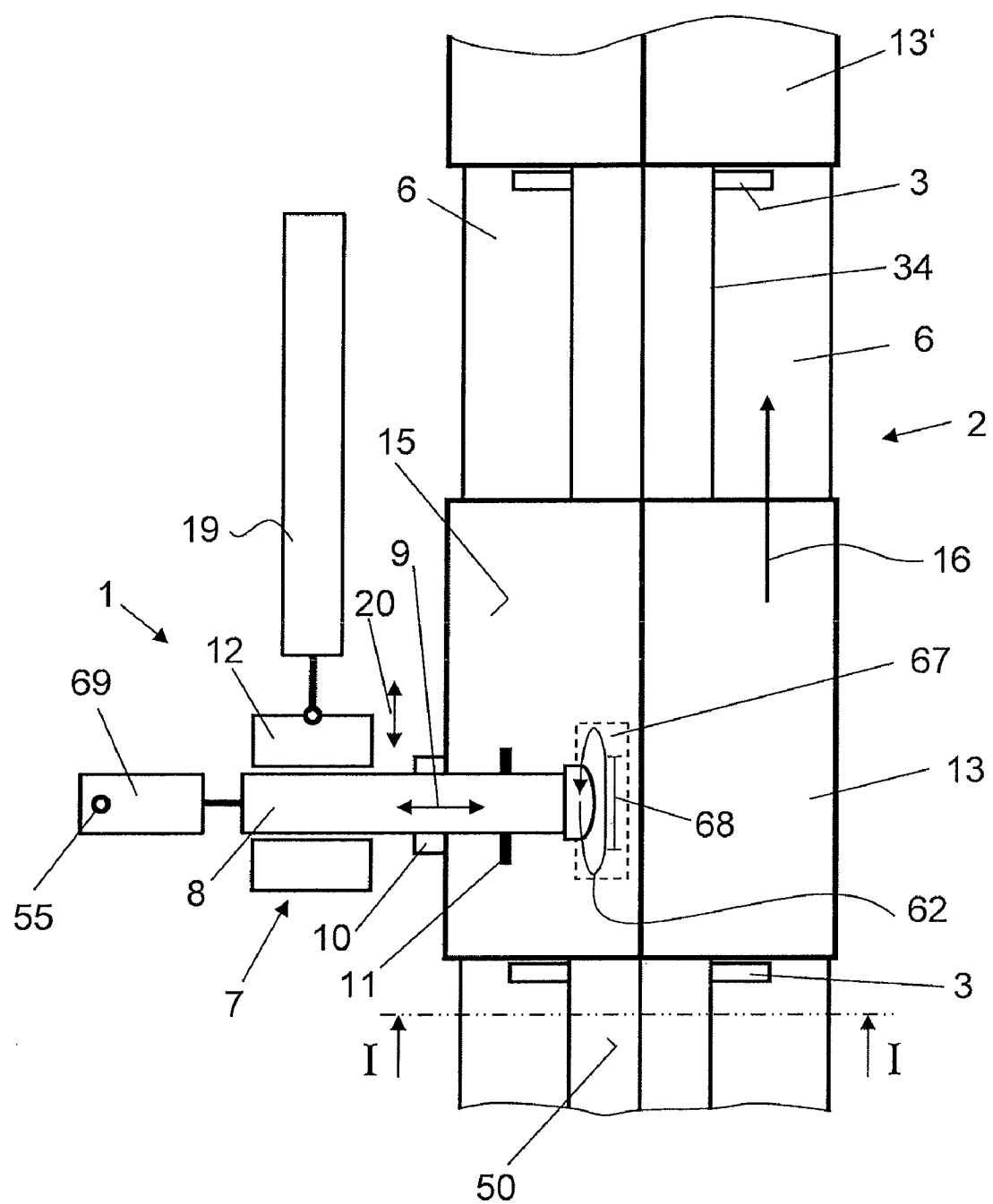
FIG. 2 is a top view of the measuring apparatus according to the invention and a section of the conveying device.

An embodiment of a measuring apparatus 1 shown in FIGS. 1 and 2 may be arranged on a gathering and wire-stitching machine 2 that is known per se, in which the opened printed products 13 are conveyed while positioned straddling on a conveying device 4, in the direction of arrow 16 (FIG. 2). The conveying device 4 may be a gathering chain that is provided with respectively two pushers 3, projecting from the side and arranged with uniform spaces, wherein these pushers respectively grip one printed product 13. The gathering and wire-stitching machine 2 may consist of a support frame 5 that is provided at the upper end with a saddle-shaped guide arrangement 34 for guiding the printed products 13. The printed products 13 respectively have a fold 14 and can be simple folded sheets or also newspapers, magazines, brochures and the like. The saddle-shaped guide arrangement 34 according to FIG. 1 and the fold 14, however, are not absolutely necessary. The printed products 13 furthermore can also be books that are conveyed with a suitable conveying device. For example, the books could be conveyed inside a channel or the like.

The measuring apparatus 1 comprises a measuring element 8, which can be moved inside a guide element 12 in the directions of the double arrow 9. With the aid of the guide element 12 that is connected to a drive 19 (see FIG. 2), the measuring element 8 can be pivoted around a pivoting axis 55. The pivoting movements of the measuring element 8 in the directions of the double arrow 20 are synchronized with the conveying speed for the printed products 13. The measuring element 8 is connected to another drive 69, positioned in the axis 55, which moves the measuring element 8 in the direction of the double arrow 9, wherein this movement is also synchronized with a process, or pre-determined, timing of the conveyed printed products 13. The drives 19 and 69 preferably comprise a linear motor that is not shown herein.

Figure 3A:
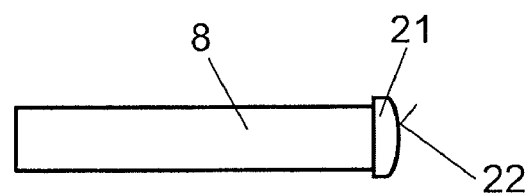
FIGS. 3a-3d depict embodiments of the measuring element according to the invention.
Figure 3B:
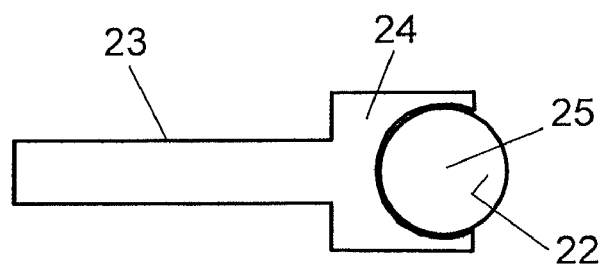
Figure 3C:
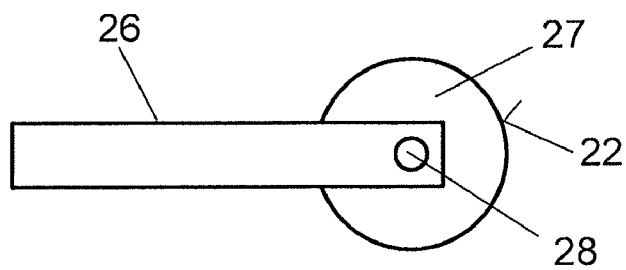
Figure 3D:
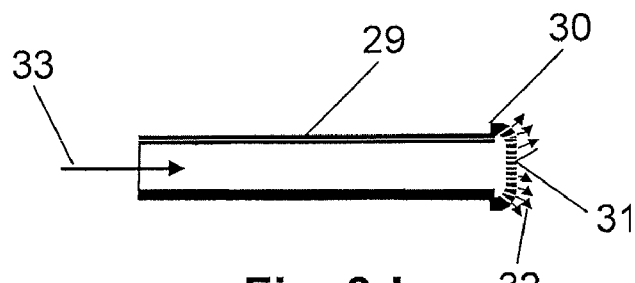

The measuring element 8 may have a rod-shaped or die-shaped form with a head 21 that contains a sensing surface 22, as shown in FIG. 3a. This head 21 forms the frontal or end face on the front of the measuring element 8. An alternative measuring element 23, shown in FIG. 3b, comprises a head 24 with a ball 25 positioned rotating therein. The ball 25 in that case forms the sensing surface 22. An embodiment according to FIG. 3c shows a measuring element 26 provided on its front end with a wheel 27, which is positioned such that it can pivot around an axis 28. The wheel 27 in this case forms the aforementioned sensing surface 22. Finally, a sectional view shown in FIG. 3d illustrates a different alternative embodiment of a measuring element 29 with a head 30, provided with a sensing surface 31 on which an air cushion 32 can be generated. The head 30 is provided with openings or pores which can be supplied with air at a predetermined pressure in the direction of arrow 33. The air flows through the aforementioned openings or pores onto the sensing surface 31 and forms a cushion of air 32 thereon.

According to FIG. 1, a part 11 is attached to the measuring element 8 and is moved along with the measuring element 8. The part 11 functions to aid in measuring the distance between this movable part 11 and a stationary distance measuring device 10, which is connected to an evaluation unit 17. The distance may be determined optically, for example, with the aid of a laser, where the laser beam is reflected on the part 11. Measuring devices of this type are disclosed in the art and therefore need not be explained further herein. The position of the measuring element 8 can subsequently be determined based on this distance measurement.

Figure 6:
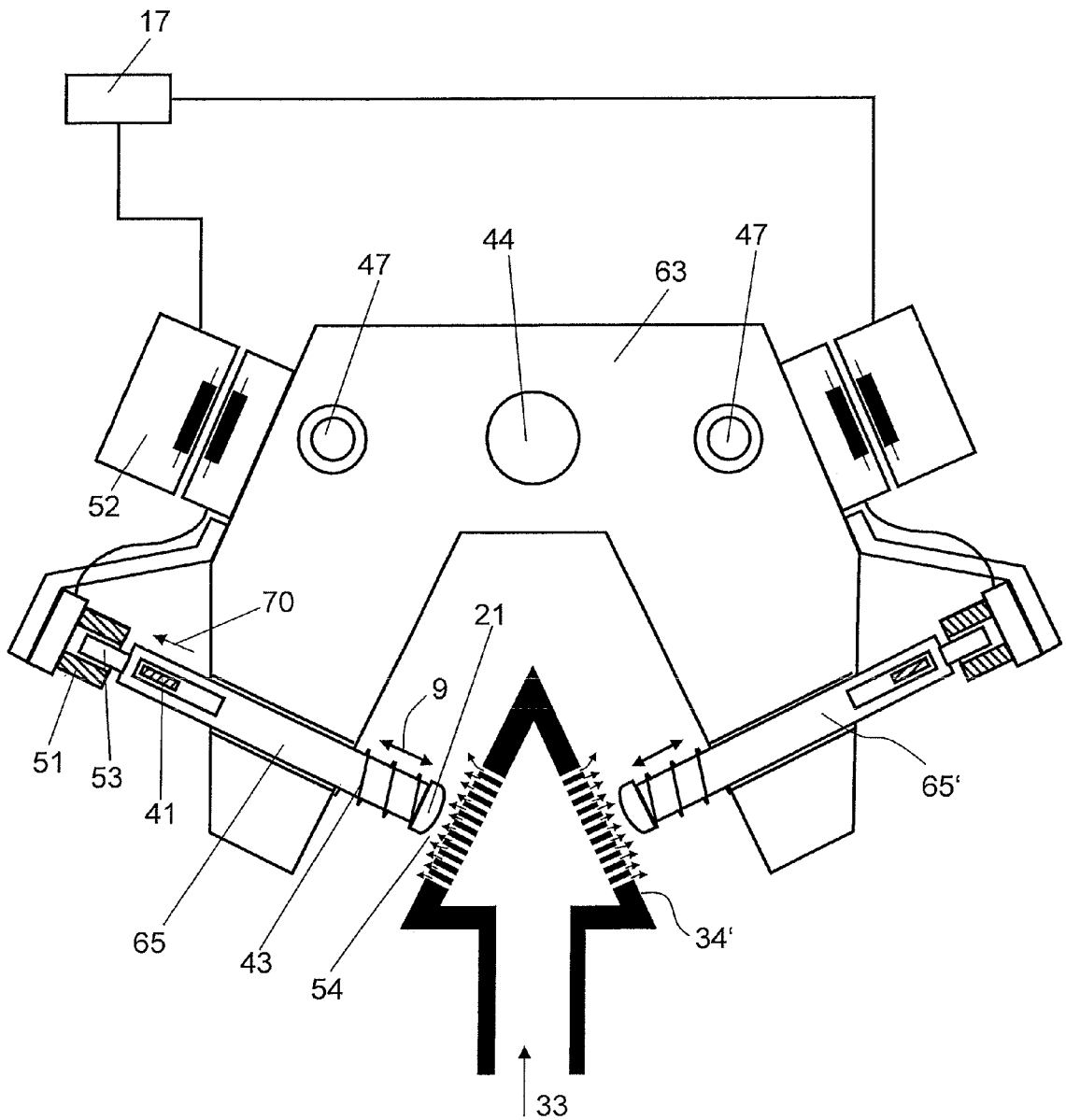
FIG. 6 is a view of another embodiment of the measuring apparatus according to the invention.

As an alternative embodiment to the optical measuring of the distance between the part 11 and the distance measuring device 10, it is also possible to use a measuring coil 51 into which a ferrite core 53 of the measuring element 8 is submerged for the measuring operation shown in FIG. 6. The inductance of the measuring coil is transmitted via the contactless operating transmitting unit 52 to the evaluation unit 17. The measuring element is moved within a measuring region 67 (shown in FIG. 2) of the guide arrangement 34. The sensing surface 22 (shown in FIGS. 3a-3b) acts upon the outside 15 (see FIG. 2) of the printed product 13, wherein the length of time the printed product is acted upon can be adjusted. The distance a printed product 13 travels on the conveying device 4 while acted upon by the measuring element 8 is referred to as the measuring section 68 (see FIG. 2). However, other suitable types of distance measurements are also conceivable.

Figure 8:
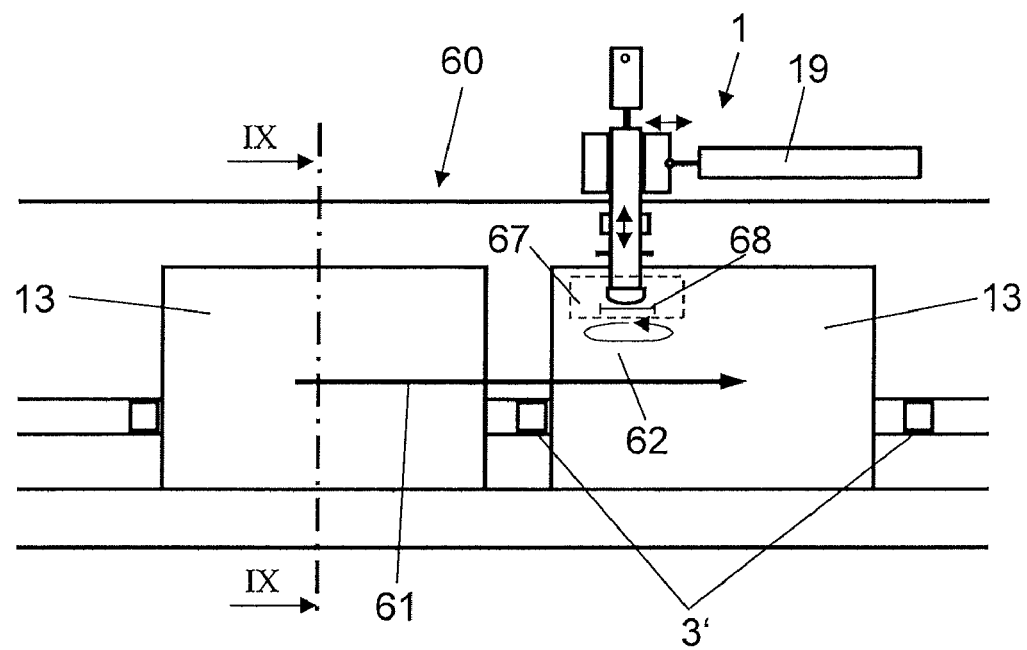
FIG. 8 is a side view of the apparatus according to the invention and a section of the conveying device.

By superimposing the pivoting movement around a pivoting axis 55 and the approach movement in the direction of the double arrow 9, the head 21 (see FIG. 3a) of the measuring element 8 travels along a path 62 which is indicated in FIG. 2. The same applies correspondingly for the measuring elements 23, 26 and 29. The pivoting speed is adjusted such that the sensing surface 22 essentially moves in conveying direction of the printed product 13 along the measuring section 68 with the timing of the printed product 13. It is advantageous if the duration of the contact between the printed product 13 and the measuring element 8 is constant and independent of the conveying speed of the conveying device 4. The measuring section 68 consequently becomes shorter if the conveying speed increases. However, it is also conceivable that the measuring section 68 remains constant and the period during which the measuring element acts upon the printed product is adapted to the conveying speed of the conveying device 4. At the end of the measuring section 68, the drive 69 pulls back the measuring device 8 and, with the aid of a pivoting movement, returns the measuring device 8 to the starting position. In order to realize a measurement, the head 21 of the measuring device 8 describes a path 62, as shown in FIGS. 2 and 8. It is furthermore conceivable to take a plurality measurements on a printed product 13.

Figure 5:
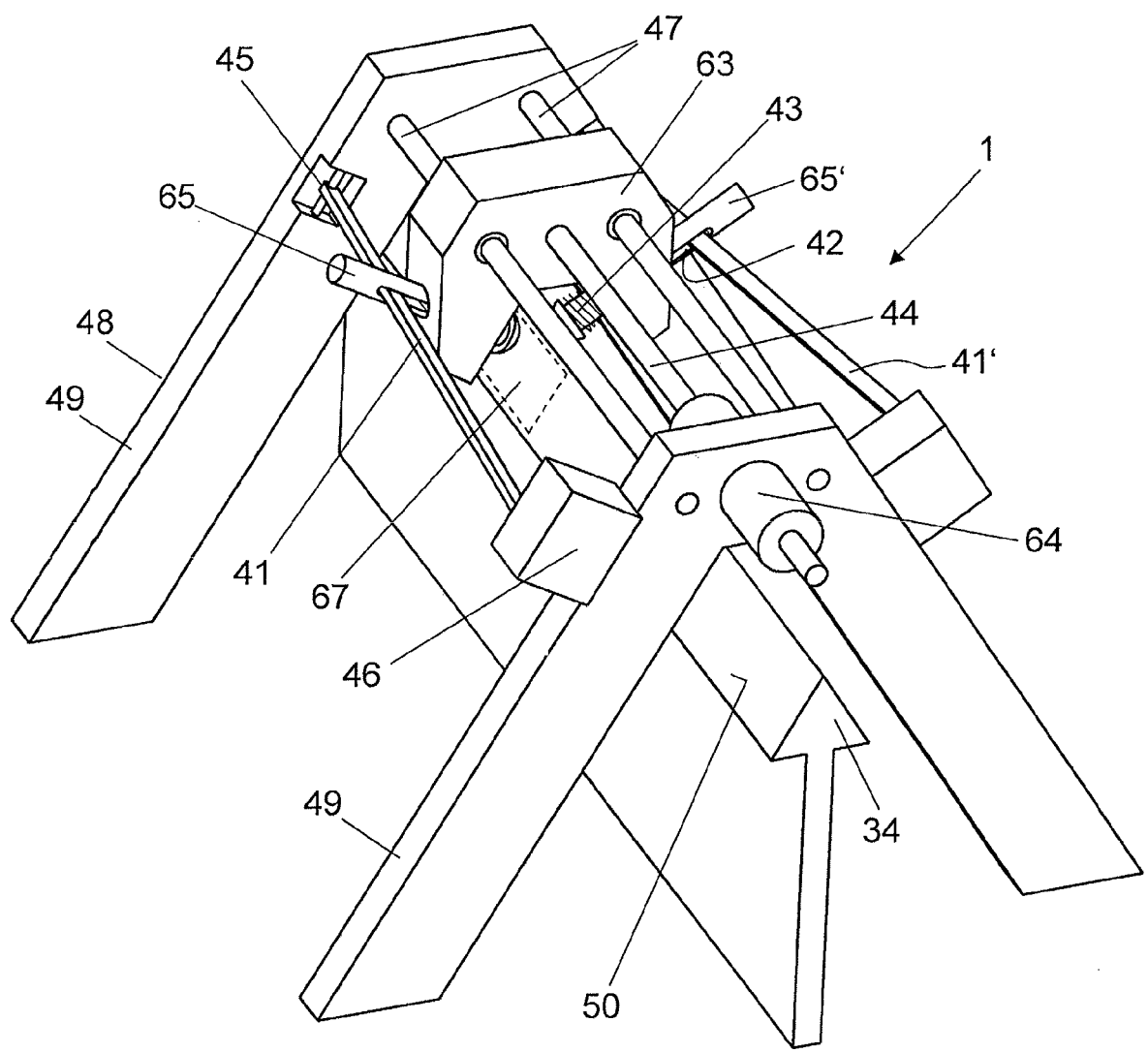
FIG. 5 is a three-dimensional view of the measuring apparatus according to the invention and a section of the conveying device.

A guide element 63 for the alternative embodiment shown in FIG. 5 may be positioned to be displaceable along two guide rods 47 that extend parallel to the conveying direction. The two guide rods 47 are mounted on two supports 49, arranged at a distance to each other, thereby allowing the guide element 63 to move back and forth between these two supports 49. The guide element 63 is moved, for example, with the aid of a drive 64, positioned on a support 49, which is connected via a drive rod 44 to the guide element 63. For this, the drive 64 may be provided with a linear motor, not shown in further detail herein, which is controlled with the timing of the conveying device 4.

The movement of the measuring element 65 in a direction transverse to the conveying direction may be controlled with the aid of a control rod 41, 41', which is connected at one end via a rotating joint 45 to one of the supports 49. At the other end, the control rod 41, 41' may be connected to a drive 46, which moves this control rod in the direction of arrow 70 and away from the guide arrangement 34, shown in FIG. 6. The measuring element 65 may be provided at the end located opposite the head 21 with a recess 42 in which the control rod 41 can engage. For the measuring element 65 to act upon the printed product 13, the drive 46 moves the control rod 41 counter to the direction of the arrow 70 (see FIG. 6). A spring element 43 may act upon the measuring element 65 to cause the measuring element 65 to be pressed in the measuring region 67 against the guide arrangement 34 and thus against a printed product 13. Once the measuring operation is completed, the measuring element 65 is lifted with the aid of the control rod 41 from the printed product, wherein the spring element is compressed in the process. The above-mentioned distance measuring device 10 is shown in FIGS. 1 and 2. A measuring coil 51 with a ferrite core 53 can furthermore be used for measuring the distance in this case, as shown in FIG. 6, or an optical measuring method can alternatively be used.

If a printed product 13 that is positioned on the guide arrangement 34 is moved through a measuring gap 54, the printed product 13 is guided by two sheet metal guides 6 at a distance to the guide arrangement 34, as shown in FIG. 1. The thickness of the printed product 13 is measured at the same time, at least in a region below the fold 14. For this, the measuring element 8 is moved in conveying direction, preferably with essentially the same speed as the printed product 13. As shown in FIG. 6, if the front of the head 21 on the measuring element 65 acts upon the printed product 13 along the measuring section 68, as a result of the pressure exerted by the spring element 43, then the measuring element 65 moves essentially with the same speed as the printed product 13. The measurement can thus be taken without movement between the sensing surface 22 and the outside 15 of the printed product 13, meaning without friction and squeezing. In the region where it is acted upon, the printed product 13 is pressed against the surface 50 (see FIG. 5) of the guide arrangement 34 as a result of the pressure from the measuring element 8, 65. The guide arrangement 34 consequently functions as a fixed-frame background for the conveyed printed product 13.

Figure 4A:
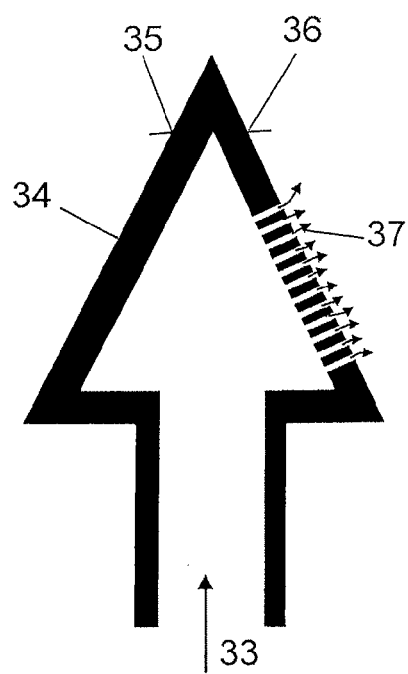
FIGS. 4a-4c are section views through embodiments of the conveying device according to the invention.
Figure 4B:
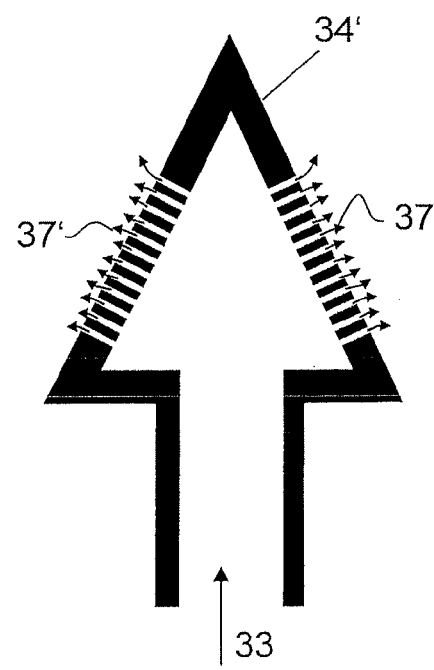
Figure 4C:
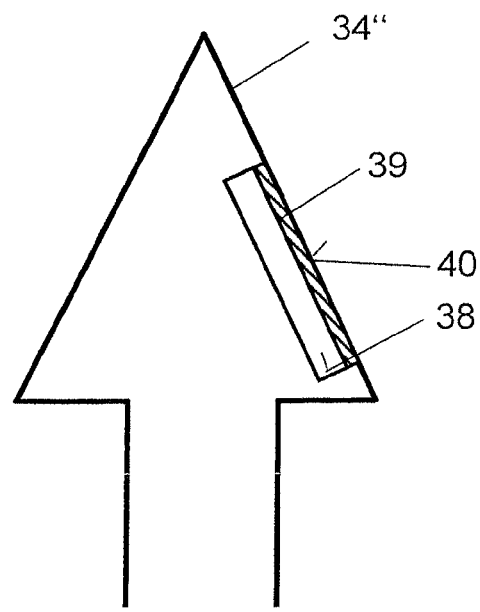

The guide arrangements 34, 34' and 34" shown in FIGS. 4a to 4c can be used, for example, to keep the damage to the printed product 13 at a minimum in the acted upon region of the guide arrangement 34. The guide arrangement 34 shown in FIG. 4a is provided with two surfaces 35 and 36 that converge at an acute angle, with the surface 36 being acted upon in this case. To reduce friction, a cushion of air 37 can be generated in the region 67 (see FIG. 2) to be measured, which is located on the surface 36. The surface 36 is here provided with a plurality of openings having a comparatively small diameter, for example about 10 to 30 micrometers. Air with a pressure, for example of 6 bar, is generated on the inside of the guide arrangement 34. This air flows in the direction of arrow 33 through the openings toward the outside and forms the aforementioned cushion of air 37.

With the guide arrangement 34' according to FIG. 4b, air cushions 37 and 37' are formed on both surfaces. The guide arrangement 34' is intended for an embodiment using two symmetrically arranged measuring elements 65 and 65', as shown in FIGS. 5 and 6. This type of embodiment is explained in further detail below.

The guide arrangement 34" according to FIG. 4c is provided in the measuring region 67 (see FIG. 5) with a recess 38, with therein inserted plate-shaped insert 39. This insert 39 has a surface 40 with a particularly high gliding ability for the printed product 13. The friction-reducing insert 39 can be produced, for example, from a suitable fluoridated plastic or can be coated with a suitable material, wherein a cushion of air can be generated alternatively or in addition thereto.

The distances traveled by the measuring elements 65 and 65' until they act upon the printed product 13 are measured with the aid of the distance measuring device 10 or the coil 51, as explained above, and the measured value is transmitted to the evaluation unit 17 (see FIG. 6). The thicker the printed product 13 in the region of contact, the shorter the distance. The measured value is compared to a reference value, which is determined without the presence of a printed product 13. A reference measurement of this type can be repeated periodically.

As soon as the measuring elements 65 and 65' no longer act upon the printed product 13, they are again moved to the raised position while the spring 43 is tensioned in the process. This movement can be either cam-controlled or, as described in the above, with the aid of a linear motor. As previously explained, a printed product 13 can also be measured twice or more than two times in different regions during the same cycle. For example, it is possible to check in this way whether a card, a goods sample or the like is glued onto the printed product 13 as planned. In addition, an average value can also be computed with these measurements. In any case, an even more secure and precise measurement is thus possible.

With the embodiment according to FIGS. 5 and 6, the respective measurements are taken simultaneously and in a symmetrical position to a center plane by the two measuring elements 65 and 65'. As a result, the measuring forces exerted by the measuring elements 65 and 65' primarily cancel each other out, thereby making possible an even more precise measurement. In addition, the printed products 13 are respectively measured in two regions, which can have the same thickness or different thickness. For example, a goods sample arranged on one side, meaning the side facing the measuring element 65', is also measured in this way and the presence of the goods sample is checked.

Figure 9:
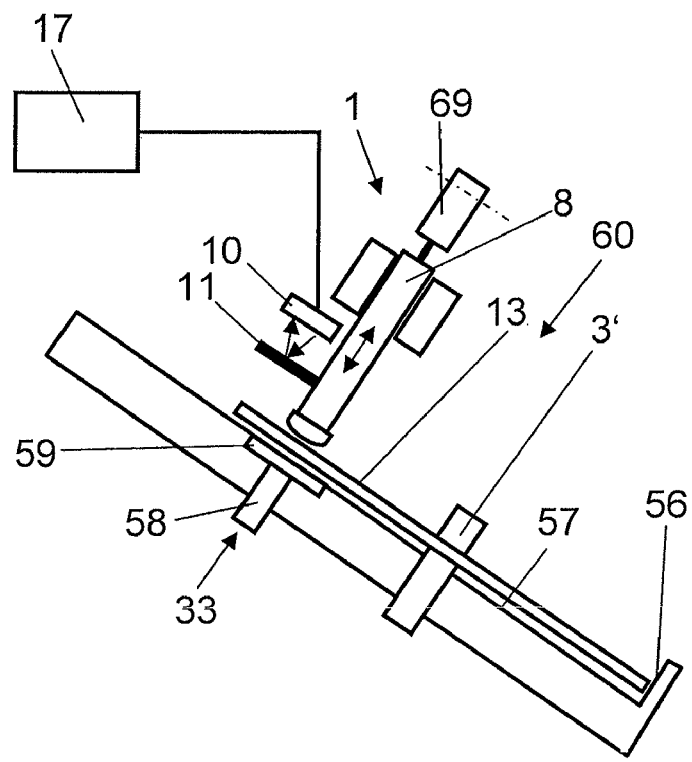
FIG. 9 is a section view through the measuring apparatus according to the invention, as seen along the line IX-IX in FIG. 8.

An gathering machine or inserting machine 60 is shown in FIGS. 8 and 9, for which the printed products 13 are conveyed with the aid of pushers 3' inside a channel 57. According to FIG. 8, the direction of transport for the products is from the left to the right, as indicated by the arrow 61. In that case, the printed products 13 respectively fit against a lower edge 56 of the channel 57, as shown in FIG. 9. The thickness is measured with the aid of a measuring device 1, which can be embodied as explained above. In place of the guide arrangement 34, the measuring element 8 acts upon a plate 59 that forms the measuring region 67 and is arranged stationary in the channel 57. The plate 59 can be embodied to reduce friction and can be composed of a material that optimizes the gliding ability, or it can be provided with openings, not shown herein, and can be connected via a connection 58 to a compressed air source. An air cushion (not shown) accordingly forms on top of the plate 59. The printed products 13 again are conveyed one behind the other, synchronized with the timing, and can include individual sheets, newspapers, brochures, books and the like.

Figure 7A:
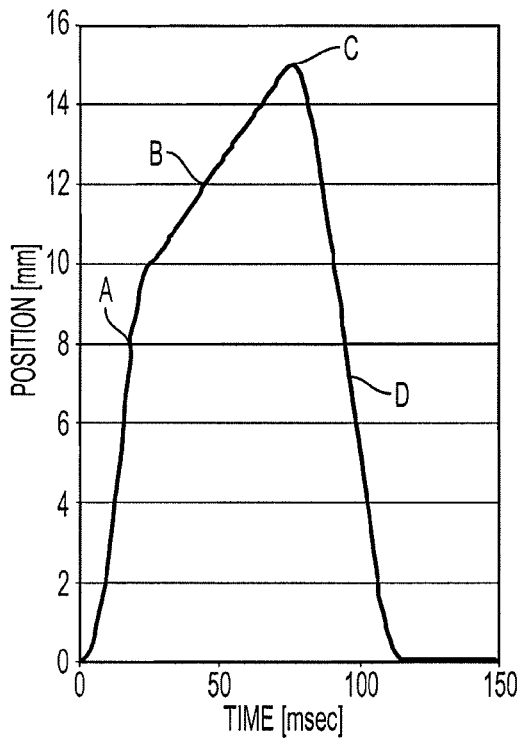
FIGS. 7a-7c are movement profiles for the measuring element according to the invention, wherein the vertical axis indicates the position and the horizontal axis indicates the time.

The position of the sensing surface 22 during a sensing operation is shown with a curve in FIG. 7a, without a printed product 13 or a guide arrangement 34. The movement of the measuring element 8 is controlled such that it moves with comparatively high speed in a region A. In a region B, this speed is reduced until the point C is reached. A region D follows the point C, in which the measuring element 8 is again moved back into the resting position or the starting position. This movement is carried out counter to the spring 43 tensioning and can also occur at comparatively high speed. For example, the total cycle occurs during a time interval of approximately 100 milliseconds, wherein the travel distance in this case ranges from approximately 14 to 16 millimeters.

Figure 7B:
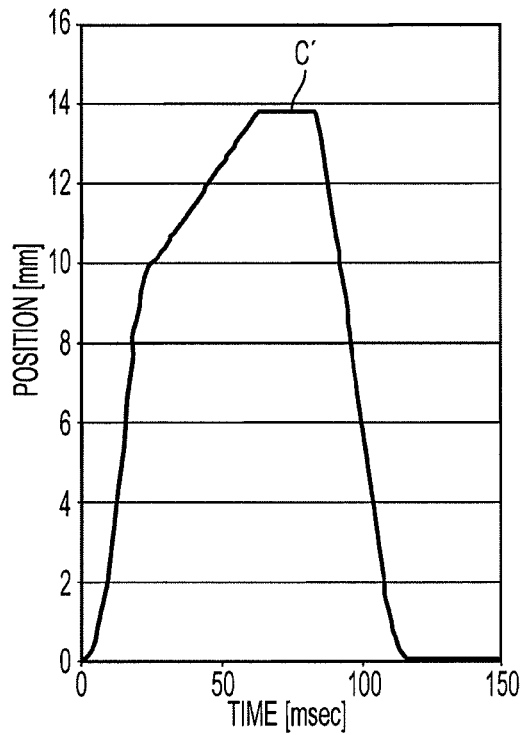

FIG. 7b illustrates the movement of the measuring element 8 during a reference measurement, wherein this measurement is taken without a printed product 13 and against a locally fixed guide arrangement 34. A region C' is created as a result of the contact with the guide arrangement 34 and the plate 59, in which the measuring element 8 glides along the guide arrangement 34. However, the movement of the measuring element 8, 65, 65' in conveying direction can be omitted for a reference measurement. The measuring element 8 in that case can act upon the guide arrangement simply by moving it in the direction of double arrow 9.

Figure 7C:
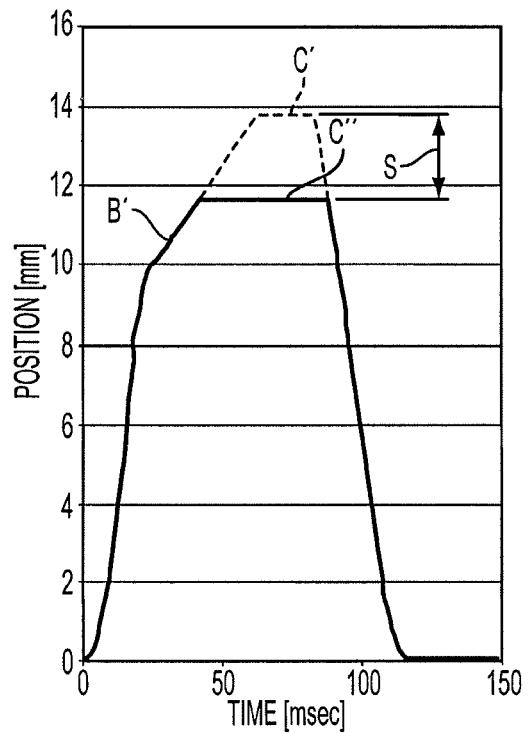

FIG. 7c shows the course of the curve when taking a thickness measurement on a printed product 13. The distance traveled by the measuring element 8 is limited as a result of a thickness S of the one leg on the printed product 13, thus resulting in a region C" that is correspondingly longer than the region C'. Prior to reaching the region C", there is also a region B' in which the speed of the measuring element 8 is reduced. The advantage of this speed reduction is that the measuring element 8 and the sensing surface 22 arrive with comparatively low speed on the printed product, consequently leaving few marks. A suitable and optimum speed reduction can be derived from a reference measurement according to FIG. 7b. In the embodiment according to FIG. 7c, the thickness S of one leg of the printed product 13 is approximately 2 millimeters, as can be seen when comparing the FIGS. 7b and 7c. The measuring device according to another embodiment would allow measuring thicknesses of approximately 0.05 to 20 millimeters or greater.

It will be understood that the above description of the present invention is susceptible to various modifications, changes and adaptations, and that the same are intended to be comprehended within the meaning and range of equivalents of the appended claims.

What is claimed is:

1. An apparatus for measuring a thickness of a printed product conveyed in a conveying direction at a conveying speed, the apparatus comprising:
    a conveying device having a guide arrangement along which the printed product is conveyed at the conveying speed in the conveying direction, the guide arrangement including a measuring region that extends in the conveying direction of the guide arrangement;
    a measuring element operative to act on printed sheets of the printed product to measure the thickness of the printed product while the printed product is conveyed across the measuring region and through a measuring gap located between the measuring element and the guide arrangement, and wherein the measuring element is arranged to move toward the guide arrangement with a process timing and to move synchronously with the printed product at the conveying speed across the measuring region of the guide arrangement; and
    an evaluation unit connected to the measuring element.

2. The apparatus according to claim 1, wherein the measuring region comprises a section of the guide arrangement.

3. The apparatus according to claim 2, wherein the measuring region is operative to reduce friction.

4. The apparatus according to claim 3, wherein the measuring region comprises an air cushion.

5. The apparatus according to claim 3, wherein the measuring region comprises a material which maximizes gliding ability.

6. The apparatus according to claim 2, wherein the measuring element contacts the printed product to measure the thickness of the printed product and the measuring region includes a measuring section having a length in the conveying direction which depends on an amount of time that the measuring element remains in contact with the printed product.

7. The apparatus according to claim 1, wherein movement of the measuring element towards the measuring gap is delayable.

8. The apparatus according to claim 1, further comprising a distance measuring device arranged to measure a distance between the measuring element and the guide arrangement while the thickness of the printed product is being measured.

9. The apparatus according to claim 8, wherein the distance measuring device comprises one of a sensor or an electrical coil.

10. The apparatus according to claim 1, wherein the measuring element includes a guide element and the guide element includes a motor arranged to drive the measuring element along the guide arrangement in the conveying direction to measure the thickness of the printed product and in a direction reverse to the conveying direction toward a resting position.

11. The apparatus according to claim 1, wherein the measuring element includes a front end with an air cushion.

12. The apparatus according to claim 1, wherein the measuring element moves in one of a linear motion or is pivotable around a back end to enable measuring the thickness of the printed product.

13. The apparatus according to claim 1, further including a tension spring arranged so that the measuring element moves toward the printed product through a force of the tensioned spring.

14. The apparatus according to claim 1, wherein the measuring element constitutes a first measuring element and further comprising a second measuring element arranged essentially symmetrical with the first measuring element in relation to the conveying direction of the conveying device.

15. The apparatus according to claim 14, wherein the first and second measuring elements are simultaneously actuatable.

16. The apparatus according to claim 1, wherein the printed product is conveyed straddling on the guide arrangement, and wherein the measuring element is arranged to measure the thickness of at least one leg of the printed product.

17. A gathering machine having a channel and including the apparatus according to claim 1 to measure the thickness of the printed product while conveyed inside the channel.

18. A method to measure the thickness of a printed product in a channel of a gathering machine, comprising utilizing the apparatus according to claim 1.

* * * * *